(12) United States Patent
Rabie et al.

(10) Patent No.: US 11,893,094 B1
(45) Date of Patent: Feb. 6, 2024

(54) DCT-BASED WATERMARKING SCHEME FOR DEEP NEURAL NETWORKS

(71) Applicant: University of Sharjah, Sharjah (AE)

(72) Inventors: Tamer Rabie, Sharjah (AE);
Mohammed Baziyad, Sharjah (AE);
Ibrahim Kamel, Sharjah (AE);
Grigory Kabatyansky, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 18/205,857

(22) Filed: Jun. 5, 2023

(51) Int. Cl.
*G06F 21/16* (2013.01)

(52) U.S. Cl.
CPC .................... *G06F 21/16* (2013.01)

(58) Field of Classification Search
CPC ...................................................... G06F 21/16
See application file for complete search history.

(56) References Cited

U.S. PATENT DOCUMENTS

| | | | |
|---|---|---|---|
| 10,270,642 B2* | 4/2019 | Zhang | G01S 13/00 |
| 10,482,879 B2* | 11/2019 | Tang | G10L 15/02 |
| 10,789,941 B2* | 9/2020 | Lopatka | G06N 3/045 |
| 11,010,929 B2* | 5/2021 | Xie | G06N 3/084 |
| 11,430,090 B2* | 8/2022 | Yoo | G06T 5/50 |
| 2019/0164050 A1* | 5/2019 | Chen | G06N 3/084 |
| 2021/0311162 A1* | 10/2021 | Mai | G01S 7/415 |
| 2022/0386945 A1* | 12/2022 | Wu | A61B 5/4809 |
| 2023/0188384 A1* | 6/2023 | Claffey | H04L 25/022 375/262 |
| 2023/0273291 A1* | 8/2023 | Ozturk | G01S 7/415 342/52 |

OTHER PUBLICATIONS

Mauro Barni, "DNN Watermarking: Four Challenges and a Funeral", Article, 2021, 1-8, Proceedings of the 2021 ACM Workshop on Information Hiding and Multimedia Security.
Yuki Nagai, "Digital watermarking for deep neural networks", Journal, 2018, 1-14, International Journal of Multimedia Information Retrieval.

(Continued)

*Primary Examiner* — Viral S Lakhia
(74) *Attorney, Agent, or Firm* — Hayes Soloway PC

(57) ABSTRACT

The invention discloses a DNN watermarking method, comprising embedding part of the digital watermark in selected redundant elements of a deep neural network (DNN) model—without compromising the performance of the DNN. The proposed method aims for a robust watermark scheme by embedding a large watermark that can span the whole DNN model. If an adversary attempts to destroy the watermark, the whole DNN model will be destroyed. However, maximizing the hiding capacity can lead to degradation in the performance of the DNN model. In this work, this capacity-performance trade-off problem is solved using the Discrete Cosine Transform (DCT). Moreover, the DCT can work more efficiently with highly correlated data. Therefore, this work suggests segmenting the weights of the DNN model into correlated segments to fully exploit the advantages of the DCT.

5 Claims, 4 Drawing Sheets

(56) References Cited

OTHER PUBLICATIONS

Meng Li, "Protecting the intellectual property of deep neural networks with watermarking: The frequency domain approach", Article, 2020, 402-409, 2020 IEEE 19th International Conference on Trust, Security and Privacy in Computing and Communications (TrustCom), IEEE.

Marco Botta, "NeuNAC: A novel fragile watermarking algorithm for integrity protection of neural networks", Journal, 2021, 228-241, vol. 576, Information Sciences.

Shuo Li, "Parameterization of LSB in self-recovery speech watermarking framework in big data mining", Article, 2017, 1-12, Security and Communication Networks.

Shengbei Wang, "Inaudible speech watermarking based on self-compensated echo-hiding and sparse subspace clustering", Article, 2019, 2632-2636, ICASSP 2019, 2019 IEEE International Conference on Acoustics, Speech and Signal Processing (ICASSP), IEEE.

Gran Badshah, "Watermark compression in medical image watermarking using Lempel-Ziv-Welch (LZW) lossless compression technique", Journal, 2016, 216-225, Journal of digital imaging.

Tamer Rabie, "The pixogram: Addressing high payload demands for video steganography," Article, 2019, vol. 7, 21948-21962, IEEE Access.

Hanzhou Wu, "Watermarking neural networks with watermarked images", Article, 2021, 2591-2601, vol. 31, No. 7, IEEE Transactions on Circuits and Systems for Video Technology.

Betty Cortinas-Lorenzo, "Adam and the Ants: On the Influence of the Optimization Algorithm on the Detectability of DNN Watermarks", Article, 2020, 1-36, vol. 22, No. 1379, Entropy.

April Pyone, "Piracy-Resistant DNN Watermarking by Block-Wise Image Transformation with Secret Key", Article, 2021, 159-164, Proceedings of the 2021 ACM Workshop on Information Hiding and Multimedia Security.

Mingfu Xue, "DNN Intellectual Property Protection: Taxonomy, Attacks and Evaluations", Article, 2021, 455-460, Proceedings of the 2021 on Great Lakes Symposium on VLSI.

Tianhao Wang, "RIGA: Covert and Robust White-Box Watermarking of Deep Neural Networks", Article, 2021, 993-1004, Proceedings of the Web Conference 2021.

\* cited by examiner

DCT-BASED WATERMARKING SCHEME FOR DEEP NEURAL NETWORKS

FIELD OF THE INVENTION

The present invention relates to the field of watermarking Deep Neural Networks (DNNs), and more particularly to a Discrete Cosine Transform (DCT) based DNN digital watermarking scheme.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Protecting the copyright of DNN models using watermarks is a new research area. Digital Watermarking was a popular method proposed to protect the copyright of multimedia data such as text, images, audio, and video segments. Based on the hiding domain, classical watermarking techniques can be classified into native-domain schemes and frequency-domain schemes. In a native-domain scheme, secret messages are embedded in the native-domain data samples. On the other hand, frequency-domain schemes embed the watermark into a selected part of the frequency spectrum of the cover signal. The Least Significant Bit (LSB) techniques are an example of a native-domain scheme. In an LSB scheme, the secret message is embedded in the LSB planes of the cover signal. LSB schemes are simple and easy to implement. However, simple LSB schemes suffer from low robustness and security levels.

On the other hand, transform-based schemes tend to embed the secret data in the frequency domain of the cover image. Transformation is done using one of the main frequency domain techniques such as the Discrete Wavelet Transform (DWT), Discrete Fourier Transform (DFT), and the Discrete Cosine Transform (DCT), or by using different versions of these main techniques such as the Dual-Tree Complex wavelet transforms (DTCWT), Complex wavelet transforms (CWT), and the Integer Wavelet Transform (IWT).

Watermarking schemes exploit the inherent redundancy present in these media formats to conceal secret messages in plain sight. In text watermarking, techniques often exploit the redundant nature of language, such as using subtle modifications in word choice, sentence structure, or even invisible characters like whitespace or line breaks. Audio watermarking techniques, on the other hand, take advantage of the human auditory system's limited perception by embedding secret information within imperceptible frequency ranges or exploiting the masking effect of louder sounds. In image watermarking, the vast color space and the presence of subtle patterns allow for hiding data within the least significant bits of image pixels or by modifying the color values slightly. Video watermarking techniques utilize the temporal redundancy between successive frames or exploit the discreet modifications in motion vectors or pixel values. In each case, the goal is to embed the hidden information in a way that avoids arousing suspicion, ensuring that the watermarked payload remains undetectable to casual observers while still being recoverable by authorized parties using appropriate extraction methods.

Similarly, watermarking schemes can also benefit from the redundancy available in a DNN model. DNN models exhibit parameter redundancy, with an abundance of parameters allowing for diverse learning perspectives and regularization. Feature redundancy ensures critical information preservation and enhances generalization by capturing similar or correlated features across layers. Temporal redundancy, utilized in recurrent neural networks (RNNs), enables modeling of sequential dependencies and time-varying patterns. Ensemble methods introduce redundancy by combining multiple models, mitigating errors and improving overall accuracy. Activation redundancy in DNN models maintains information integrity and fault tolerance by encoding similar information across neurons. The incorporation of redundancy in DNN models enhances stability, adaptability to challenges, and reliability in handling noisy or incomplete data.

Previous works have identified Intellectual Property (IP) concerns of DNNs and adapted digital watermarking techniques for ownership authentication in the DNN domain. Existing methods have been categorized into two types based on the application scenarios of the DNN model.

The first type is white-box watermarking. In the white box setting, the pretrained DNN model for the intended task (computer vision, speech recognition, etc.) is shared with the end-users. This means that model internals including weight parameters and activation maps are publicly accessible. Such a deployment scenario is common with the increasing trend of knowledge exchange among the research community. A previous publication takes the first step of DNN watermarking and develops a customized regularization term to embed the watermark in the weight distribution of the selected DNN layer. To improve the security and robustness, a previous publication proposes to insert the watermark in the distribution of dynamic activations corresponding to the secret key input. Another disclosure uses weight regularization and incorporates anti-collusion codes for watermark design to enhance the watermarks resistance against averaging attacks.

Another type is black-box watermarking, wherein a pretrained DNN model is employed as a remote service where the customer sends his data to the cloud server and receives the corresponding output. Since the DNN model is only available as an oracle, prior works suggest crafting secret input-output pairs as the watermark. To insert the watermark in the model's decision boundary, the watermark key set is used to finetune the model. As an example, a publication proposes to craft adversarial samples as the watermark set, which results in high false alarm rates due to the transferability of adversarial examples. To resolve the issue, random inputs and random labels are generated as the watermark key set.

Existing DNN watermarking techniques have several known constraints. First is the high embedding overhead resent DNN watermarking primitives embeds the watermark via model re-training, which might be prohibitively costly and robustness. Current watermarking schemes are also susceptible to careful model disturbance such as transfer learning.

Based on the above, there is a need to develop a new approach or method to overcome the drawbacks and shortcomings of these traditional systems/methods with respect to DNNs and adapted digital watermarking techniques for ownership authentication in the DNN domain, and to show better results.

SUMMARY OF THE INVENTION

Aspects of the disclosed embodiments seek to provide a system with respect to DNNs and adapted digital watermarking techniques for ownership authentication in the DNN domain.

Embodiments of the present invention relate to a DNN watermarking method for preventing intellectual attacks on a DNN model, comprising embedding part of the digital watermark in selected redundant elements of a deep neural network (DNN) model—without compromising the performance of the DNN, wherein part of the digital watermark is embedded in random elements of the DNN model.

In accordance with an embodiment of the present invention, the method prevents an attacker from benefiting from removing the digital watermark by embedding the digital watermark in a way wherein removing the digital watermark destroys the DNN model, making the DNN model useless.

In accordance with another embodiment of the present invention, the DNN model adopts discrete cosine transform (DCT) to express a signal within significant DCT coefficients, leaving a plurality of insignificant coefficients to host part of the digital watermark.

In accordance with another embodiment of the present invention, selecting weights from random locations of the DNN ensures spanning the digital watermark over the entire DNN model.

In accordance with another embodiment of the present invention, the weights are segmented into homogeneous segments in order to further exploit the strong compaction property of the DCT, which allows to hide large amount of data without significantly compromising the performance of the DNN model.

In accordance with another embodiment of the present invention, the method enables the digital watermark to blend into surrounding coefficients in a transform domain comprising inspecting an average value of the surrounding coefficients and scaling the digital watermark to match the average value of the surrounding coefficients.

As another aspect of the present invention, a method of data hiding based on exploiting redundant information of a deep machine learning model is proposed, the method comprising randomizing a watermark signal by applying discrete cosine transform (DCT) on homogenous segments of the watermark signal, maximizing hiding capacity of the watermark signal by utilizing the DCT as the transformation technique; and hiding the watermark in redundant elements of the deep machine learning model.

In accordance with another embodiment of the present invention, the method further comprises extracting weights of the deep machine learning model, creating homogeneous segments out of the extracted weights, transforming the extracted weights into a frequency domain, identifying insignificant coefficients of the frequency domain and replacing the insignificant coefficients with the watermark signal; and transforming the modified weights back to the native domain.

In accordance with another embodiment of the present invention, compaction property of the DCT strengthens when applied to correlated segments of data, and therefore, the weights are segmented into correlated segments before applying the DCT.

In accordance with another embodiment of the present invention, the watermark signal is randomized before embedding to increase robustness of the watermark signal.

As another aspect of the present invention, a method to automatically identify insignificant frequency coefficients C from a vector of frequency coefficients V is proposed, the method comprising the steps of selecting a JPEG quantization matrix Q and normalizing the JPEG quantization matrix Q, extracting a diagonal of the matrix Q and resizing the diagonal of the matrix to match the size of the vector of frequency coefficients V, dividing the resized vector d' by the frequency coefficients element by element, and flooring the resultant vector div (div'), finding indices of zeros in the floored resultant vector div' (Loc) and extracting the frequency coefficients at Loc.

In accordance with another embodiment of the present invention, the method further comprises constructing a sub-vector which includes the first two weights, checking a homogeneity level of the sub-vector and adding the next weight from an original vector to the sub-vector if the sub-vector is still homogenous, while creating a new sub-vector if the sub-vector is heterogenous.

In accordance with another embodiment of the present invention, homogeneity level is determined by comparing a pre-defined threshold value with the difference between the maximum and minimum values of the sub-vector.

Additional aspects of the invention will be set forth in part in the description which follows, and in part will be obvious from the description, or may be learned by practice of the invention.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
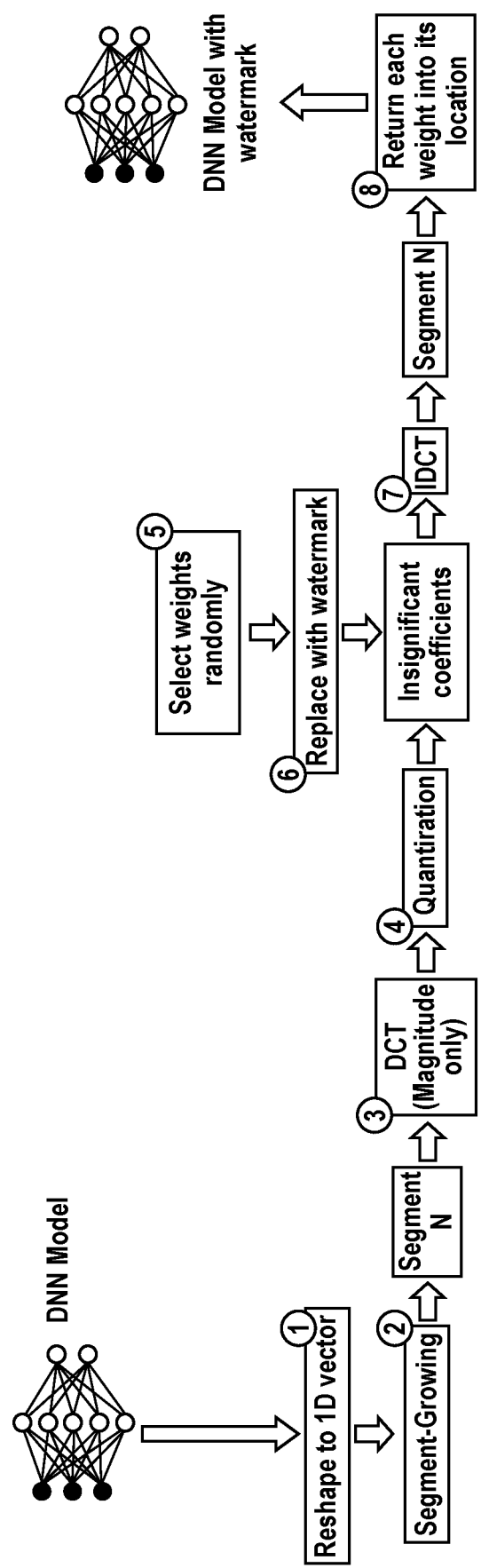
FIG. 1 is a general illustration of the proposed DNN watermarking scheme in accordance with the present invention.

The foregoing and other objects, features and advantages of the present invention, as well as the invention itself, will be more fully understood from the following description of preferred embodiments, when read together with the accompanying drawings.

DETAILED DESCRIPTION

The present invention relates to the field of watermarking deep neural networks (DNNs), and more particularly to a Discrete Cosine Transform (DCT) based DNN digital watermarking scheme.

The principles of the present invention and their advantages are best understood by referring to FIG. 1 to FIG. 3D. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Deep Neural Networks (DNNs) are the fundamental component of complex AI-based products and services conducted by major commercial companies. Building an effective DNN model is a non-trivial task that requires a huge amount of data and high-end computing resources to design, train, and test DNN models. For example, the Google's Inception-v4 DNN model for image classification was trained using ImageNet dataset which consists of 1.4 million images. It took around 3 years to collect the images of ImageNet dataset. Around 2100 GPUs were used to train the Inception-v4 DNN model for multiple weeks. Another example, the AI virtual assistant Siri service has costed Apple more than 200 million dollars. Because of the high value of DNN models, they are highly vulnerable to Intellectual Property (IP) attacks where an adversary can falsely claim the ownership of a DNN model. This work proposes a new robust mechanism to provide copyright protection services to DNN models using digital watermarks. The rationale of the proposed technique is that robustness can be achieved by embedding a large watermark that can span the whole DNN model. If an adversary attempts to destroy the watermark, he will end up destroying the DNN model. Moreover, to increase the robustness level, the watermark signal is first randomized before hiding. If a specific portion of the DNN was heavily attacked, the proposed technique can still recover the watermark with acceptable quality since the noise will be randomized and not clear in the recovered signal especially if it was an image. However, maximizing the embedding capacity will strongly degrade the performance of the DNN model. To control the performance-capacity-robustness trade-off, the proposed scheme utilizes the Discrete Cosine Transform (DCT) due its strong compaction property. It has been proven that the compaction property of the DCT becomes stronger when applied to correlated segments of data, and therefore, the proposed technique segment the weights into correlated segments before applying the DCT. The experimental results have proven the effectiveness of the proposed DNN watermarking scheme as it is able to embed a 1.73 MB of data with only a 1.4% drop in the classification accuracy of a standard Residual Neural Network with 21 Convolutional layers.

This present invention proposes a comprehensive copyright protection technique to overcome challenging intellectual property attacks on DNNs. The proposed technique utilizes digital watermarking concepts, which are widely adopted to protect the copyright of multimedia data. The proposed DNN watermarking technique suggests embedding part of the watermark in some selected redundant elements of the DNN model. A challenging problem that faces watermarking algorithms is to hide the watermark without compromising the performance of the DNN. Including DNNs that are highly optimized, they contain some percentage of redundancy. The secret watermark should ideally replace the existing redundancy. Concepts from Information Theory and Signal Processing are used to quantify the amount of redundancy exists in a DNN model. The proposed watermarking technique inspects the DNN structure to find less sensitive elements that are suitable to host the watermark. Another challenging problem is the robustness of the watermark and its ability to withstand attacks. The proposed watermark should be embedded in critical elements of the DNN. Thus, attacks such as eliminating or distorting the watermark would destroy the DNN and render it unusable.

For example, training a Convolutional Neural Network (CNN) for image classification on a large dataset such as ImageNet, which consists of millions of images, can take several days to several weeks on multiple GPUs. The high value of DNN models therefore makes them highly vulnerable to Intellectual Property (IP) attacks. The owner or an authorized user of a commercial DNN can give or sell the commercial DNN model to others. Users can misuse a licensed model by claiming ownership of DNN models and selling plagiarized AI services. In another challenging scenario, the adversary can re-train or fine-tune a licensed commercial DNN model and sell the modified version on the market. Thus, copyright protection of commercial DNN models is an important service that will help large companies and enterprises to protect their intellectual property in machine learning. The concept of marking digital multimedia content to protect its copyright is called digital watermarking. Digital watermarking consists of two phases: watermark embedding and watermark verification.

In the embedding phase, a watermark (identification information) is embedded into the carrier data, i.e., the data to be protected, using an embedding algorithm. If the multimedia is stolen by adversaries, the owner can extract the watermark in the watermark verification phase and present the extracted watermark as proof of ownership. Watermarking is widely used in images, audio and video. Inspired by this concept, watermarking has been applied to DNN models to protect the intellectual property of DNNs. Therefore, if a watermarked DNN model is stolen, the model owner can prove his ownership of the model. However, watermarking DNNs is not the same as watermarking multimedia due to their different nature, so traditional watermarking algorithms are not directly applicable. The research area of protecting the intellectual property of DNNs is a relatively new research area, and thus several weaknesses and challenges are net not yet solved. The objective of the present invention is to implement a novel comprehensive watermarking technique that has the ability to overcome and resist various intellectual property attacks. The simple detection of a watermark in a DNN by an adversary is an attack. Detecting the presence of a watermark in a stolen model gives an adversary the opportunity to adapt the behavior of the model to avoid detection of the watermark by the legitimate party. Another type of watermark attack is watermark removal. An adversary could also try to remove the watermark completely from a stolen model. The proposed watermark should be embedded in critical elements of the DNN. Thus, attacks such as removing or distorting the watermark would destroy the DNN and render it unusable. Another challenge is to provide the intellectual property protection service throughout the DNN network. In other words, the embedded watermark should cover most of the DNN model. Spanning the watermark on the DNN model is important to counter the pruning attack, where the attacker removes less important neurons in an attempt to destroy possible watermarks hidden in such an area. Another scenario where spanning can help is when an attacker copies part of the DNN model. Since the watermark is distributed throughout the DNN model, the watermark will still exist within the copied part of the DNN model, and therefore the ownership of the copied DNN can still be verified. However, the spanning process simply means that more data is hidden in the DNN model.

There is a well-known trade-off between the hiding capacity and the performance of the watermarked DNN model. Generally, hiding is performed by replacing some part of the DNN model with the watermark data. Naturally, the more data hidden, the more the deterioration of the structure of the DNN model, and therefore, reduced performance. The Discrete Cosine Transform (DCT) has been previously proposed as a preferred tool to deal with the capacity-performance trade-off. The DCT is a Fourier-related transform that can break a time-domain signal into its primary cosine functions oscillating at different frequencies. The DCT transform is famous for its strong energy compaction property. It has the ability to compress a signal within a few significant coefficients leaving a substantial number of insignificant coefficients. Moreover, it has been known that the compaction property of the DCT is stronger when applied to homogeneous data.

In accordance with the present invention, an essential requirement for a successful watermarking system is to be able to embed robust watermarks that can resist attacks. A dangerous attack is the attempt of an adversary to completely remove the embedded watermark. To prevent benefiting from removing the watermark, the proposed watermarking technique tend to embed the watermark in a way in which removing the watermark will destroy the DNN model, and thus making the DNN model usefulness. To achieve this objective, the proposed DNN watermarking scheme embeds the watermark signal in many different sectors of the DNN model. This is done by utilizing a randomization technique and store the watermark signal in selected segments determined by the randomization technique. Since the watermark is embedded "everywhere", the attempt of removing the watermark will destroy the whole DNN model. Another benefit of spreading the watermark over the DNN network is to be able to provide copyright protection services on the whole DNN model. However, increasing the amount of hidden data will naturally affect the performance of the DNN model. The three opposing attributes, the hiding capacity, the robustness, and the performance form together a trade-off problem. To overcome this trade-off challenge, the proposed DNN watermarking scheme adopts the DCT transform to benefit from its strong energy compaction property. This DCT property has the ability to express a signal within a few significant DCT coefficients, leaving a large number of insignificant coefficients that can host the secret data. Following the fact that the compaction property of the DCT is stronger when applied to homogeneous data, the proposed DNN watermarking scheme tend to extract the weight in a vector and segment them into correlated segments. Applying the DCT on these correlated segments ensures powering the compaction property of the DCT, and thus, hiding more data while preserving the performance of the DNN model.

A data hiding method is hereby proposed based on the rationale of exploiting the redundant information of a deep learning model by hiding a digital watermark in all or some of the redundant elements of the machine learning model comprising the steps of extracting the weights of the machine learning model, creating homogeneous segments out of the extracted weights, transforming the weights into a frequency domain, identifying the insignificant coefficients, selecting a watermark signal, replacing the insignificant coefficients with the watermark signal and transforming the modified weights back to the native domain. The robustness level may be enhanced by randomizing the watermark signal before embedding. Furthermore, the robustness level can be further maximized by maximizing the capacity and span the watermark over the whole DNN model. The hiding capacity can be maximized by utilizing the Discrete Cosine Transform (DCT) as the transformation technique. The hiding capacity can be further maximized by applying the DCT transform on homogenous segments.

In another embodiment, a watermark extraction method performed in an inverse procedure of the hiding method is proposed comprising the steps of extracting the weights of the deep learning model, creating homogeneous segments out of the extracted weights, transforming the weights into a frequency domain, identifying the insignificant coefficients, and extracting the watermark from the coefficients located at the locations of embedding. Also disclosed is a method to automatically identify the insignificant frequency coefficients C from a vector of frequency coefficients V. The proposed method consists of selecting a JPEG quantization matrix, normalizing the JPEG quantization matrix Q, extracting the diagonal of the matrix and resizing the diagonal of the matrix (d) to match the size of the frequency coefficients vector V, followed by dividing the resized vector d' by the frequency coefficients element by element, flooring the resultant vector div (div'), finding the indices of the zeros in the floored resultant vector div' (Loc) and then extracting the frequency coefficients at Loc.

In another embodiment of the present invention, a method to automatically segment a vector of weights comprising constructing a sub-vector which includes the first two weights, checking the homogeneity level of the sub-vector, adding the next weight from the original vector to the sub-vector if the sub-vector is still homogenous, while creating a new sub-vector if the sub-vector is heterogenous. The homogeneity level is determined by comparing a pre-defined threshold value with the difference between the maximum and minimum values of the sub-vector. A method is also proposed to help the watermark signal to blend into the surrounding coefficients in the transform domain comprising inspecting the average value of the surrounding coefficients and scaling the watermark to match the average value of the surrounding coefficients.

FIG. 1 illustrates a general block-diagram of the proposed DNN watermarking scheme. The steps shown in FIG. 1 comprise initially selecting random weights. The first step is to use a randomization technique to select weights from random positions. For example, the Linear Congruential Generator (LCG) random sequence X is obtained using the following equation:

$$X_{n+1} = (aX_n + c) \bmod m \qquad \text{Equation (1)}$$

wherein m is the length of the vector, 0<a<m, 0<c<m, m and c are relatively prime, a−1 is advisable by all prime factors of m and a−1 is divisible by 4 if m is divisible by 4.

Figure 2:
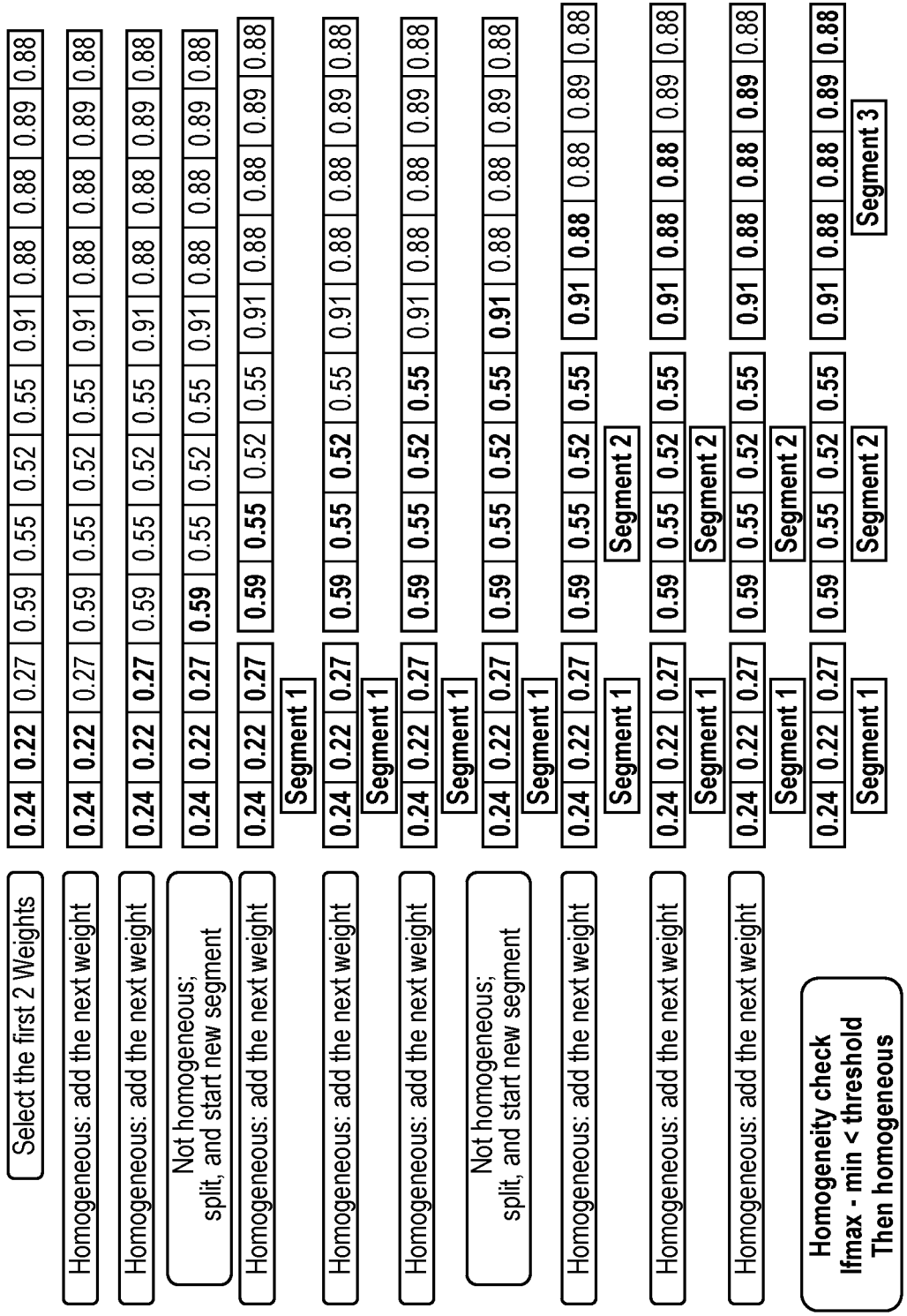
FIG. 2 shows an example of the segment-growing technique.
Figure 3A:
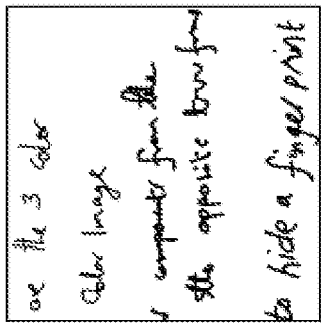
FIGS. 3A-3D depics extracting the watermark after attacking the DNN.
Figure 3B:
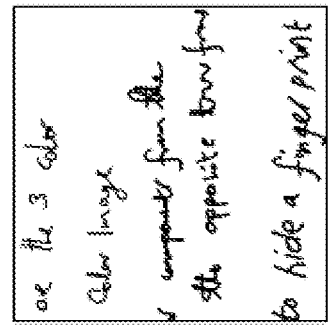
Figure 3C:
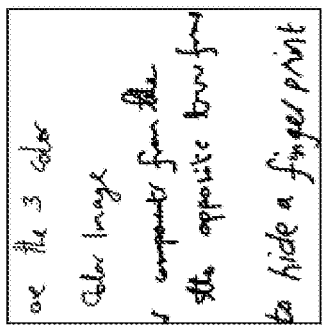
Figure 3D:
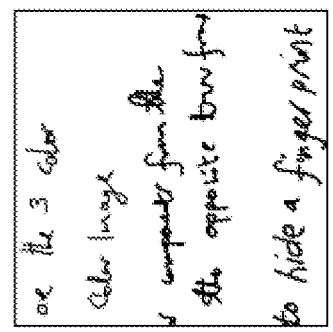

This is followed by the step of reshaping to 1D vector. The weights that are located at X locations founded by LCG (equation 1) are grouped and listed in a 1D vector. The third step includes Segment-Growing, the objective of this step being segmenting the 1D vector into homogeneous segments. An example of the segment-growing technique is illustrated in FIG. 2. This segmentation technique starts by grouping weights sequentially. The algorithm keeps adding new weights into the group until the homogeneity criteria fails. Once heterogeneity is detected, the algorithm removes the newly added weight from the group and starts with it a new group (segment). This process is repeated iteratively until the end of the 1D vector. The homogeneity criteria are founded by inspecting the difference between the highest and the lowest values in a group. If the difference is lower than a pre-defined threshold, then the group is assumed to be homogeneous. Similarly, if the difference is higher than the pre-defined threshold, then the group is assumed to be heterogeneous.

The next step includes applying DCT, the reason of segmenting the 1D vector into correlated segments is to insure maximizing the strong compaction property of the DCT as it has been found that the DCT compaction property becomes stronger when applied to a correlated set of data. The DCT is calculated using:

$$Y_k = \sum_{n=0}^{N-1} y_n \cos\left[\frac{\pi}{N}\left(n + \frac{1}{2}\right)k\right]$$ Equation (2)

where k=0, 1, 2, ..., N–1 and $Y_k$ is the $k^{th}$ DCT output while $y_n$ is the time-domain sample at n. Next, hiding is performed in the magnitude of the DCT extracted while the DCT phase is kept intact. There are several scientific reports which indicate that the phase spectrum preserves more critical information about the signal, and therefore, it is useful to keep the phase spectrum intact.

In the next step Quantization, this process is used to find the insignificant coefficients. The quantization process used in this invention is inspired by the JPEG quantization process. For images, the significant coefficients are packed into the top-left corner of the DCT. To filter out the significant coefficients, the quantization process divides the DCT matrix with a designed standard quantization matrix. The quantization matrix has low values towards the top-left corner of the matrix, while the values increase towards the bottom-right corner. The standard quantization matrix used in accordance with the present invention is:

$$Q = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$ Equation (3)

Since the DCT vector to be quantized is a 1D vector, the diagonal of the main standard matrix is extracted:

$Q_d = \text{diag}\{Q\}$ Equation (4)

$Q_d = [16\ 12\ 16\ 29\ 68\ 104\ 120\ 99]$ Equation (5)

Next, the $Q_d$ vector is rescaled to be in range [0-1]:

$Q_r = [0.04\ 0\ 0.04\ 0.18\ 0.52\ 0.86\ 1\ 0.81]$ Equation (6)

After that, the DCT segment will be divided element-by-element by $Q_r$. However, to have valid division, the vector $Q_r$ is first rescaled to match the length of the DCT segment:

$r = s \oslash Q_r$ Equation (7)

The division resultant vector r is inspected for low values. The locations of values less than a pre-defined threshold in r are the locations of the insignificant coefficients in the DCT vector s. The following step includes watermark insertion, wherein the watermark is inserted by replacing the insignificant DCT coefficients which were located in the previous quantization step. The next step includes applying Inverse DCT (IDCT), wherein after hiding the watermark signal, the IDCT is applied to the segments to obtain the weight. First, the intact DCT phase (ED) is joined with the modified DCT amplitude A to obtain the full DCT signal D:

$D = A \cdot \cos(\varphi)$ Equation (8)

Then, the IDCT is applied using the following equation:

$$y_k = \frac{2}{N} \sum_{n=0}^{N-1} Y_n \cos\left[\frac{\pi}{N}\left(n + \frac{1}{2}\right)k\right]$$ Equation (9)

where n=0, 1, 2, ..., K–1, $y_n$ is the $n^{th}$ time-domain output while $Y_n$ is the DCT value at n. Subsequently, the weights are placed into original locations, wherein the modified weights are re-located back into their original locations which were selected by the randomization technique.

FIGS. 3A-3D depict extracting the watermark after attacking the DNN. The notation P refers to the classification accuracy of the DNN after the attack. Even though the DNN model was destroyed after the dense attack (P=52.3%), the watermark was still undamaged and extractable. Naturally, the performance of a DNN model will drop after embedding a watermark. On the other hand, the inserted watermark should be robust against attacks to be able to provide copyright protection service. Accordingly, in the present invention, performance of the proposed DNN technique is examined based on the accuracy drop rate and robustness level. The proposed DNN watermarking scheme is tested using a residual neural network. The structure of the residual neural network consists of 21 Convolutional layers. The residual network is trained using CIFAR-10 data set which contains 60000 32-by-32 RGB image.

Considering on the robustness attribute of the proposed watermarking technique, the robustness attribute refers to the ability to extract the watermark even after an adversary attacks the DNN model. Pruning attack is an example of a watermark removal attack. In a pruning attack, the less important DNN elements are inspected and removed from the DNN model. The rationale of the pruning attack is that hiding is usually performed in less significant parameters of the network, and thus, by removing such parameters, there is a chance that the watermark will be destroyed if it exists. To show the high robustness level of the proposed watermarking scheme, this experiment goes beyond pruning attack, by heavily attacking the DNN model in order to destroy the watermark. The attack is a removal attack where a number of weights are completely destroyed in order to destroy the watermark. It is important for the attacker to be able to remove the watermark without significantly affecting the classification performance of the DNN. It is clear from the results of experimental results that for all cases the watermark signal was still extractable in a good quality. The interesting result is that even though when densely attacking the DNN model with 4% removal rate and destroying the DNN model (drop to 52.3% classification accuracy), the watermark was still solid and extractable. Such attack cannot benefit the adversary because the DNN model is destroyed and cannot be used anymore.

The high robustness level of the inserted watermark is justified into two reasons. The first reason is related to the high embedding capacity of the proposed scheme which allowed for hiding a large-sized watermark signal. Due to the big size of the watermark signal, the watermark has successfully spanned the entire DNN model, and therefore, destroying part of the DNN model will not significantly affect the embedded watermark signal. The second reason is the randomization of the watermark signal. The watermark signal is first randomized and then embedded. In other words, the watermark is scattered into different parts of the DNN. Therefore, destroying a part of the DNN model will destroy secret bits from scattered locations in the watermark. Since the noise is scattered in the signal and not concentrated within a region, the degradation in the quality of the watermark signal will not be clear especially if it was an image.

Considering the Classification Accuracy Drop (examining performance of the proposed DNN watermarking scheme in terms of the accuracy drop), the insertion of the watermark is performed by manipulating the structure of the DNN model, and therefore, it is natural to experience a drop in the accuracy of the classification process. Table 1 shows the effect of embedding the watermark on the accuracy of the DNN. It is clear from Table I that the proposed scheme can embed a large-sized watermark with negligible effect of the performance of the DNN model. The embedding rate may reach up to hide a watermark of size 1.73 MB with only a 1.4% drop in the classification accuracy of the DNN. The reason of the high hiding capacity achieved without highly affecting the classification accuracy is related to the segmentation process that obtained homogeneous segments. By applying the DCT on such homogeneous segments, the compaction property of the DCT becomes stronger, and thus, more data can be hidden without significantly affect the quality of the DNN model. The other noticeable fact that the segment-growing threshold has direct effect on the embedding capacity. Increasing the threshold value decreases the embedding capacity. The reason is also attributed to the compaction property. By increasing the threshold value, the correlation criteria become looser. Therefore, weaker compaction property of the DCT results in lower embedding capacities.

TABLE I

The drop in the classification accuracy of the DNN after watermarking under different hiding capacities

| Threshold | Classification Accuracy | | | Hiding Capacity |
|---|---|---|---|---|
| | Original | With Watermark | Drop | |
| 0.01 | 97.5% | 96.1% | 1.4% | 1.73 Mb |
| 0.05 | 97.5% | 95.3% | 2.2% | 1.71 Mb |
| 0.10 | 97.5% | 96.5% | 1.0% | 1.69 Mb |
| 0.20 | 97.5% | 95.6% | 1.9% | 1.48 Mb |
| 0.30 | 97.5% | 96.2% | 1.3% | 1.29 Mb |
| 0.40 | 97.5% | 95.4% | 2.1% | 1.17 Mb |
| 0.50 | 97.5% | 95.8% | 1.7% | 1.09 Mb |
| 0.60 | 97.5% | 95.6% | 1.9% | 1.05 Mb |
| 0.70 | 97.5% | 96.2% | 1.3% | 0.88 Mb |
| 0.80 | 97.5% | 96.4% | 1.1% | 0.66 Mb |
| 0.90 | 97.5% | 96.2% | 1.3% | 0.44 Mb |

In another embodiment, the proposed watermarking scheme can be applied on different DNN models and adapting the proposed technique to different neural network models.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A method of data hiding based on exploiting redundant information of a deep machine learning model, the method comprising:
    extracting weights of the deep machine learning model;
    creating homogeneous segments out of the extracted weights;
    transforming the extracted weights into a frequency domain;
    identifying insignificant coefficients of the frequency domain and replacing the insignificant coefficients with a watermark signal; and transforming the modified weights back to a native domain,
    adopting a discrete cosine transform (DCT) to express the deep neural network (DNN) weights vector within significant DCT coefficients, leaving a plurality of the insignificant coefficients to host part of a digital watermark,
    strengthening a compaction property of the DCT when applied to correlated segments of data, and therefore, weights are segmented into correlated segments before applying the DCT.

2. The method of claim 1, wherein the watermark signal is randomized before embedding to increase robustness of the watermark signal.

3. The method of claim 1, wherein the step of creating homogenous segments further comprises:
    constructing a sub-vector which includes a first two weights, checking a homogeneity level of the sub-vector and adding a next weight from an original vector to the sub-vector if the sub-vector is still homogenous, while creating a new sub-vector if the sub-vector is heterogenous.

4. The method of claim 3, wherein the homogeneity level is determined by comparing a pre-defined threshold value with a difference between the maximum and minimum values of the sub-vector.

5. A method of data hiding based on automatically identifying insignificant frequency coefficients C from a vector of frequency coefficients V, the method comprising the steps of:
    selecting a JPEG quantization matrix Q and normalizing the JPEG quantization matrix Q;
    extracting a diagonal of the matrix Q and resizing the diagonal of the matrix to match the size of the vector of frequency coefficients V;
    dividing the resized vector d' by the frequency coefficients element by element, and flooring the resultant vector div (div');
    finding indices of zeros in the floored resultant vector div' (Loc) and extracting the frequency coefficients at Loc;
    adopting a discrete cosine transform (DCT) to express a deep neural network (DNN) weights vector within significant DCT coefficients, leaving a plurality of insignificant coefficients to host part of a digital watermark,
    strengthening a compaction property of the DCT when applied to correlated segments of data, and therefore, weights are segmented into correlated segments before applying the DCT.

* * * * *